United States Patent [19]

Aumont et al.

[11] Patent Number: 4,625,821
[45] Date of Patent: Dec. 2, 1986

[54] MOTORIZING DEVICE FOR A TRAILER DRAWN BY A TRACTOR

[76] Inventors: Gabriel Aumont, 1, rue des Landes, Z. I. Rennes Sud Est Cesson Sevigne 35510; Alain Queguiner, 20, rue des Buttes de Coesmes, Rennes 35000, both of France

[21] Appl. No.: 498,747

[22] Filed: May 27, 1983

[30] Foreign Application Priority Data

Jun. 1, 1982 [FR] France ................. 82 09494

[51] Int. Cl.[4] .............................. B62D 59/04
[52] U.S. Cl. .................... 180/14.2; 60/426; 60/449
[58] Field of Search ........... 180/14.2, 14.3, 14.6; 324/166; 60/420, 431, 445, 426, 449

[56] References Cited

U.S. PATENT DOCUMENTS

| | | | |
|---|---|---|---|
| 3,027,962 | 4/1962 | Wolf | 180/77 |
| 3,090,458 | 5/1963 | Wolf | 180/14.2 |
| 3,293,942 | 12/1966 | Stein et al. | 180/14.3 X |
| 3,360,064 | 12/1967 | Budzich et al. | 180/14.3 |
| 3,830,325 | 8/1974 | Tartar | 180/14.2 X |
| 3,854,543 | 12/1974 | Hull | 180/14.3 |
| 3,970,935 | 7/1976 | Beery et al. | 324/166 |
| 3,994,353 | 11/1976 | Greene | 180/14.3 |
| 4,027,738 | 6/1977 | Lundin | 180/14.3 |
| 4,082,157 | 4/1978 | Sternberg | 180/14.3 |
| 4,150,841 | 4/1979 | Ayotte et al. | 180/14.2 X |
| 4,244,184 | 1/1981 | Baldauf | 60/420 |
| 4,505,347 | 3/1985 | Prechtel | 180/14.2 |

OTHER PUBLICATIONS

Prinoth, Hydraulic Drive for Tracked Vehicle and Trailer, 12/82, EP 66677.
Bacquie et al., Auxiliary Hydraulic Drive for Trailer Wheels, 1/80, EP 15169.

Primary Examiner—John J. Love
Assistant Examiner—Charles R. Watts
Attorney, Agent, or Firm—Thomas J. Greer, Jr.

[57] ABSTRACT

This invention concerns a motorizing device for a vehicle, of the trailer category which is attached to a tractor equipped with a main engine organ. In particular, placed on said vehicle, the device includes: an auxiliary thermal engine (20), a plurality of hydraulic engines (50) respectively associated to each drive wheel of the trailer, an equal number of pumps (31) respectively connected to hydraulic engines (50) and associated to the auxiliary thermal engine. The device includes in addition a regulating element (100) which acts either on the hydraulic engines (50), or on the pumps (31), which is sensitive to the rotating speed of the main engine organ of the tractor.

9 Claims, 3 Drawing Figures

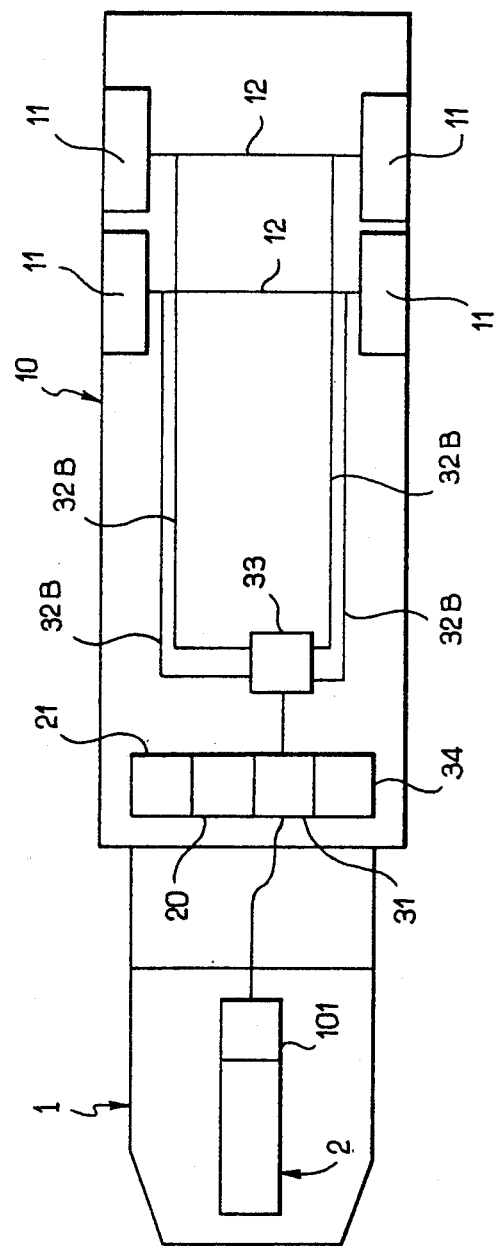
FIG_1

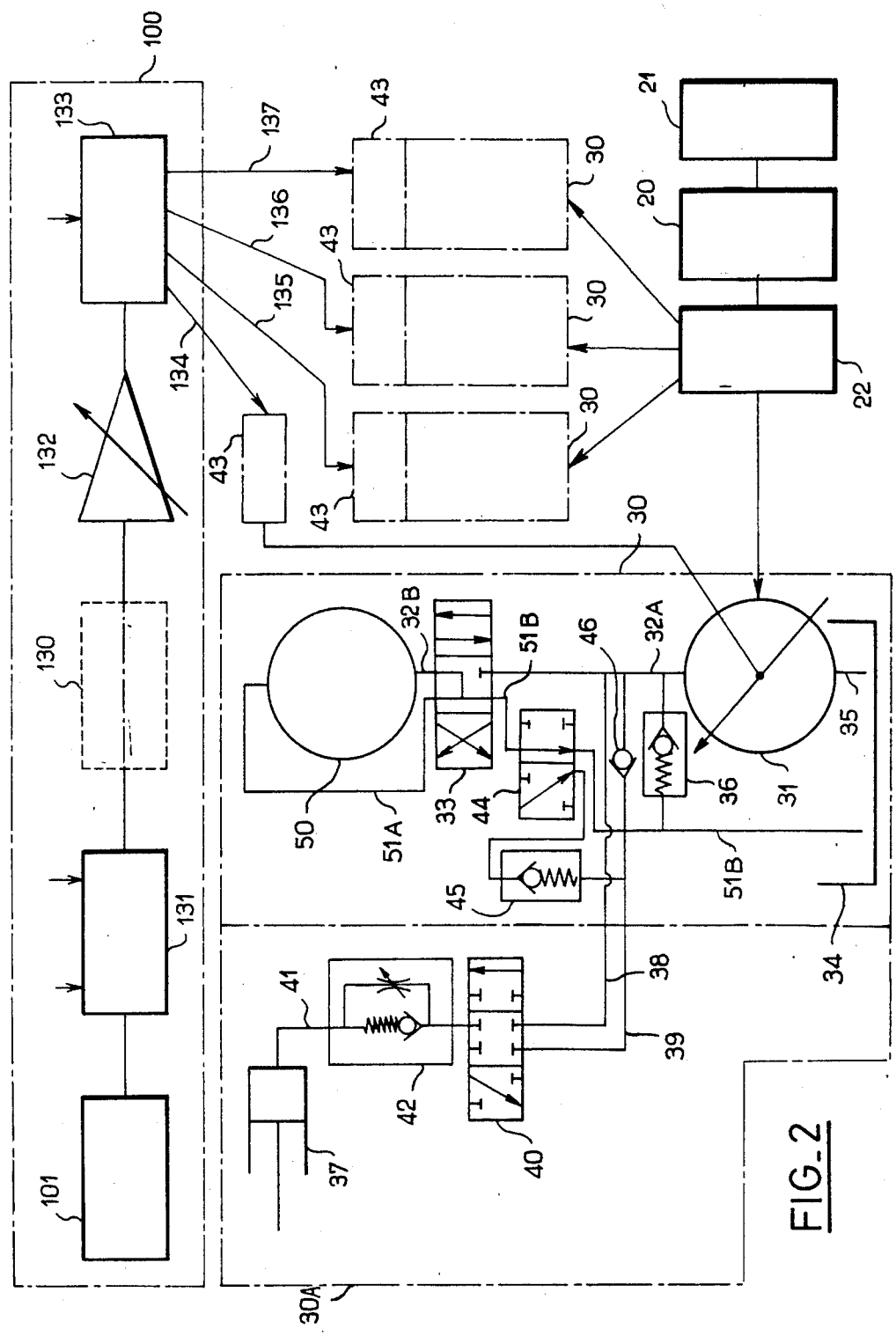
FIG_2

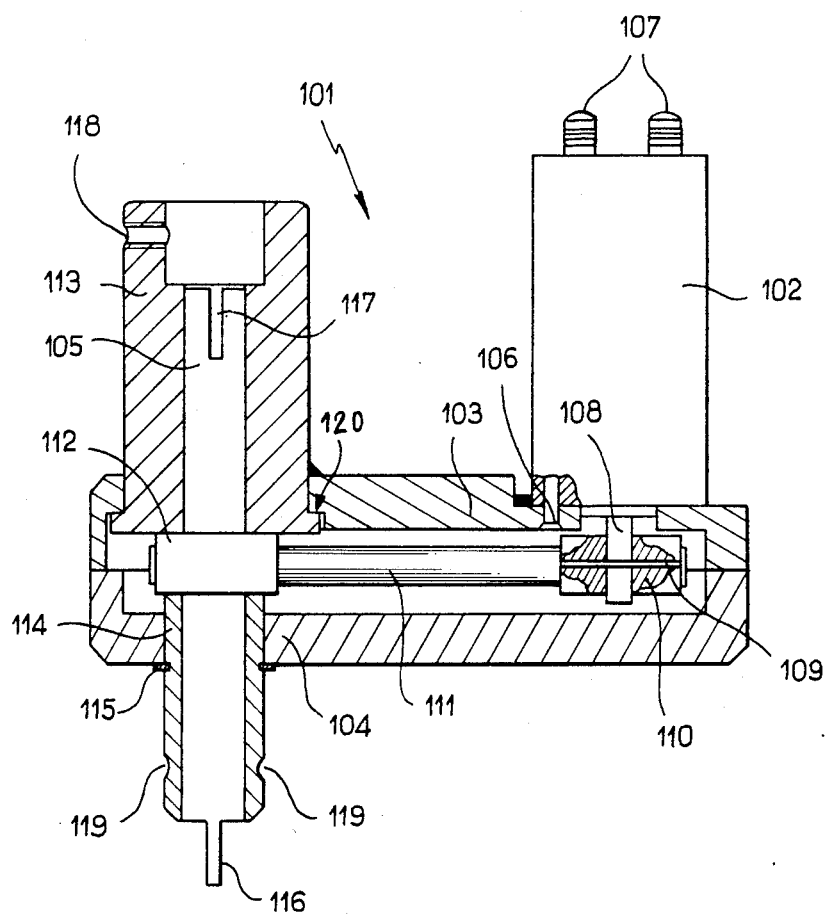
FIG_3

MOTORIZING DEVICE FOR A TRAILER DRAWN BY A TRACTOR

This invention concerns trailers and semi-trailers. This invention concerns especially a motorizing and assistance device for trailers and semi-trailers used in particular within the framework of road transportation.

For many years vehicle builders have realized that it was desirable to have tractor vehicles when a load exceeds about fifteen tons to which trailers can be tied which can bear that load, rather than vehicles carrying and towing that load. Such units formed by a road tractor and a trailer which can be detached from it are usually known as semi-trailers. However, in practice, trailer wheels are basically the carriers, so it turns out that such vehicles display a definite handicap when tractor wheel adherence is bad, for instance in the event of evolution on unstable or slippery ground.

We tried to remedy this inconvenience by giving a motive function to trailer wheels. To this end, we suggested that part of the power issued by the tractor should be sampled, which therefore must be oversized in relation to the characteristics of the trailer, to control a hydraulic pump mounted on board the tractor and, which drives so-called wheel-engines or hydraulic engines arranged at the level of the trailer driving axles.

Hence we suggested an initial system in which a multi-flow pump is mounted as a tractor casing output. However, such a system cannot provide satisfaction because, on the one hand, the maximum authorized speed is about 8 km/hr when the system is triggered, and on the other hand because the pump flow is defined by its rotating speed and that the latter is strictly dependent on the speed of the output shaft.

We also suggested another system in which a set flow pump is mounted on the tractor and is connected, by way of piping, to a variable cylinder hydraulic engine placed at the level of a driving and carrying axle of the trailer. The engine power is restricted and regulated. There too, the system does not meet with satisfaction, because below the limit energy loss is significant, while that same upper limit is quickly attained.

Finally, as described especially in U.S. Pat. No. 3,027,962, we suggested that, at the level of the trailer, an internal combustion engine should be placed which is pneumatically controlled with the tractor and mechanically coupled with the trailer driving axle. This system is basically adapted to road driving but it turns out to be too complex to be applicable industrially and it cannot provide satisfaction, at a low speed, when adherence differs for each wheel of the trailer driving axle.

As described in French patent application No. 2 295 314, we also suggested that a plurality of hydraulic engines and pumps should be placed at the level of the trailer, and associated to one auxiliary internal combustion engine, as well as a regulating element which controls pressure inside the channels which connect the pumps and the engines.

The regulating system is designed to control the overload in the auxiliary engine by comparing the rotating speed of the latter in relation to a standard value affixed to an organ inside the tractor vehicle cabin.

Such a regulating system makes it possible to avoid sudden stops, due to overload of the auxiliary engine. However, this system does not make it possible to adapt assistance power provided by the auxiliary motorizing device to the required conditions.

Hence, there is a need to have motorizing and assistance systems for trailers and semi-trailers, which provide significant assistance power, by authorizing interchangeability between trailers and tractors, while being simple, sturdy and economical in their design.

In particular, said system should make it possible to have transmission of power to the wheels of the driving axle(s) of the trailer with minimum weight and clutter, to the extent possible, make the wheels independent one from the other with respect to adherence, and especially to provide them with maximum power, even if one or more of them are not able to transmit it, enslave the trailer speed to that of the tractor, regardless of the casing ratio triggered at the level of the tractor, authorize forward and reverse operations, ultimately brake or assist in braking.

Applicants have tried to place a thermal engine on the trailer which is coupled with a generator connected to engines that are located at the level of the trailer driving axle. However, this method implies use of direct current and of similar kinds of engines in order to adapt to speed conditions. In practice, clutter and masses for those devices make this solution perfectly useless.

Applicants have also tried to place a thermal engine on the trailer which is associated to mechanical transmission that includes a mechanical casing, shaft transmission and a carrier driving bridge for each axle with self-blocking differential. However, there too in practice it turns out that this solution is not adequate, because engine control, of different characteristics, is complex, the masses are significant and speed enslavement might imply use of a very expensive automatic casing. Finally, removing the drive system from the trailer power, beyond a particular speed, might be extremely delicate from the use of gears or direct-drive dog clutches on each wheel.

Similarly, pneumatic transmission of the power issued by a thermal engine which is installed on the trailer cannot be satisfactory, because this solution might imply absolutely unacceptable sizes.

This invention is suggesting a new motorizing device for a vehicle, of the trailer type which is tied to a tractor equipped with a main engine organ, that resolves satisfactorily all of the previously raised points, and which includes, placed in said vehicle: at least an auxiliary thermal engine, a plurality of hydraulic engines, respectively associated to each driving wheel of the trailer, a similar number of pumps respectively connected to the hydraulic engines and associated to the auxiliary thermal engine, the device including also a regulating element, which is sensitive to the rotating speed of the main engine organ of the tractor and which acts accordingly either on hydraulic engines, or on the pumps, or still on an intermediate organ between them, in order to control proportionately the flow in the hydraulic circuits, that connect the engines and the pumps, and hence to control the speed of the trailer driving wheels.

As it will be clarified in the description that follows, such a characteristic makes it possible to constantly adapt the power supplied by the auxiliary motorizing device, to the required conditions.

According to a preferred implementation mode of this invention, the hydraulic circuit planned between each pump and each hydraulic engine is of the open circuit kind, said pumps discharging in the hydraulic engines of which the return is conducted inside a storage area at the level of which pump suction is carried out.

According to a characteristic of the invention, the hydraulic engines have static capacities and they are associated with variable flow pumps.

According to another characteristic of the invention, the hydraulic engines have variable capacities which are associated with set flow pumps.

According to another characteristic of the invention, the pumps with a set capacity discharge in set capacity engines, through a proportional flow regulation valve.

According to yet another characteristic of the invention, the regulating element includes a tachometric generator which is coupled functionally to the main driving organ of the tractor and is able to deliver datum which is proportionate to its speed.

According to another characteristic of the invention, a distributor of the 4 track distributor category, with 3 positions, is interspersed on the hydraulic circuit which connects each pump to the associated hydraulic engine.

According to another characteristic of the invention, at least one of the pumps is used to control an annex organ and a distributor of the 4 track, 3 channel category, of which one track is blocked, it is placed on the hydraulic circuit which connects said annex organ to the associated pump.

To this end, the regulating element includes a conditioner which can control either all of the pumps, or only the pump associated to said annex organ.

Other characteristics and advantages of the invention will appear in the detailed description that follows, facing the appended plates, provided as non-limiting examples, which must be viewed as incorporated in the description by the reference which is made of them here, wherein:

FIG. 1 depicts a schematic view from above of a towed trailer equipped with a device according to the invention;

FIG. 2 depicts a schematic view, shaped in functional blocks of the hydraulic circuit and of the regulating system of the motorizing device according to the invention, FIG. 3 depicts an axial sectional view of the speed pick-up which is used in a device according to the invention.

On the various figures the identical elements are designated by the same references.

We depicted schematically on FIG. 1 a trailer 10 which is equipped with a motorizing system according to the invention and towed by a standard tractor element 1 equipped with an engine referenced as 2, called main engine.

The motorizing system according to the invention as it is depicted in FIG. 1 includes an auxiliary thermal engine 20, like an internal combustion engine, associated to its fuel tank 21, and coupled with a group of hydraulic pumps 31, which are connected respectively to hydraulic motors, also known as "wheel engines", affixed functionally to the nave of wheels 11 of the driving axles 12 of trailer 10.

According to the depicted example, two driving axles 12 are planned, and it is therefore necessary to plan four wheel engines and four pumps 31 which are respectively associated to them.

Coupling of the thermal engine 20 and the four associated pumps 31 is carried out by way of a distribution casing 22 which is depicted schematically in FIG. 2, which includes a main shaft, on the thermal engine side 20, and four planet gears, which are attached to each pump 31. Preferably, one articulated link with elastic motion is established on the platform that is connected to the motive wheel so as to absorb the vibrations from the thermal engine and to prevent their transmission to the pumps. Of course, lubrication of the distribution casing can be achieved with all appropriate means.

For technological reasons that are connected to the couple and to the transmittable speed, as well as to braking potentials, one prefers a wheel engine of the slow hydraulic motor kind which is flanged directly onto the nave, the wheel engines made from an axial engine of which the couple is weak at high speed, which would impose use of a reducing element.

As a non limiting example, one can thus use a "hydrobase"-type wheel engine which is sold by the "Societe Poclain Hydraulique", as an "H15 wheel engine".

Preferably, as shown in FIG. 2, the hydraulic circuit which is planned between each pump 31 and the associated wheel engine 50 is of the open circuit kind. In other words, the pumps 31 discharge inside wheel engines 50 by way of a channel 32A-32B, through a distributor 33, of which the role and operation will be described in greater detail later on; while the wheel engines 50, by way of a channel 51A which is connected to the distributor 33, and which communicates with a channel 51B that emerges from the latter, return the fluid to a common tank 34 (which is depicted schematically) inside which suction from each pump 31 is achieved by way of the channel 35.

In relation to the closed circuit, by achieving hydrostatic transmission, inside which each pump discharges inside a wheel engine of which the return is conducted directly on the pump supply, the open circuit solution displays various advantages and especially makes it possible, as shown in the rest of this description, to use the hydraulic circuit for an ancillary operation and to control simply the pumps. Furthermore, the open circuit does not require an ancillary pump known also as a cramming pump as is the case in a closed circuit, to compensate for leaks and to prevent air intakes and cavitation.

According to a first implementation mode according to the invention (but not depicted in the figures), the pumps (31) can be with a set capacity, discharging inside a distributor with proportionate impact, or of which the discharge is proportionate to an electrical datum generated by the regulating system 100 that is depicted in FIG. 3.

To this end, for instance, one can use a discharge regulator of the F5C type which is sold by the ABEX DENISON Company as R5A or R5P compensating valves.

However, in practice, applicants have realized that this solution triggers substantial rolling of oil which on the one hand produces high temperature, and on the other hand, quick deterioration of oil assets.

For those reasons, one prefers using pumps 31 with variable discharge and with end-speed controls.

Of course, the characteristics of the pumps are easily determined by the man of the art in relation to the characteristics of the upheld wheel engines, and especially of their capacity, and of the maximum linear speed which one desires to attain.

As a non limiting example, one can retain as being compatible with the H 15 wheel engine which was previously mentioned and from the "Societe Poclain Hydraulique", a pump with an adjustable barrel piston-chamber of the A7V module 40 kind which is sold by the REXROTH Company. Calculations indicate that in view of the characteristics of the suppliers that pump allows for maximum linear speed of about 20 km/hr.

The discharge of those pumps, which are electrically controlled, is proportionate to the voltage, and therefore goes from zero discharge to maximum flow, for instance when applied voltage goes from 0 to 24 volts.

Applicants proceeded with tests involving a thermal engine 20, 8041 FIAT type with i.6 cylinders, the power of which is 83 kw at 2600 rpm. Tests were fully satisfactory.

Now we will describe in greater detail the hydraulic circuit 30 which connects each pump 31 with the associated wheel engine, such that the circuit is depicted in FIG. 2.

As shown in that figure, the distributor 33 which is interspersed at the level of channels 32A-32B and 51A-51B that connects each wheel engine 50 on the one hand to the associated pump 31, on the other hand to the tank 34, is of the 4 track, 3 positions kind. Such a distributor plays the forward/reverse and gearshift role.

Gearshifting is obtained by allowing voltage to drop (position depicted in FIG. 2) by way of oil return in the tank 34, so as to trigger a piston return in the main position after being solicited by the springs which are incorporated in the engines.

The forward position is obtained by allowing channels 32A and 32B on the one hand and 51A and 51B on the other hand to communicate.

The reverse position is obtained by crossing the channel links, or by bringing the channels 32A and 51A on the one hand and 32B and 51B on the other hand in communication.

As is also depicted in FIG. 2 a security operation is achieved by a valve 36 which connects, in the appropriate direction, previously mentioned channels 32A and 51B and correctly adjusted, for instance at a pressure of about 350 bars. Such a valve 36 subsequently restricts pressure inside the hydraulic circuit.

As is depicted schematically in FIG. 2, four separate and analogous hydraulic circuits 30 are planned which connect each pump 31 to the associated wheel engine 50. Of course, the number of those hydraulic circuits will be adapted in function of the number of wheel engines in use and therefore of the number of pumps.

Total autonomy for each track is thus achieved and it makes it possible to maintain an autonomy in the power of each motive wheels 11 of the trailer. Subsequently, if only one of those motive wheels 11 from the trailer is on hard or sturdy terrain, or when the three other wheels completely skid, the assistance power which is delivered by the thermal engine will be integrally transmitted to that very wheel, which makes it possible to detach the tie.

Advantageously, as is also depicted in FIG. 2, one also uses one of the pumps 31 from a hydraulic circuit 30 to control, by way of an auxiliary hydraulic circuit 30A, an ancillary organ 37, of the jack category (schematically depicted in FIG. 2) that is prone for instance to conduct lifting of buckets. To this end, the distributor 33 is in the shifting position.

The auxiliary hydraulic circuit 30A is comprised of two channels 38 and 39 which are connected respectively to the previously mentioned channel 32A, as pump output, and to the previously mentioned channel 51B as tank return 34.

The two channels 38 and 39 lead to a distributor 40 four tracks, 3 positions, of which one track is blocked.

The distributor output 40 is linked with a channel 41, and by way of a strangulating check-valve 42 to the ancillary organ 37 that was previously mentioned.

In an initial position of distributor 40, (as depicted in FIG. 2), the ancillary organ 37 is disconnected from the hydraulic circuit 30 of pump 31.

In a second distributor position 40, the ancillary organ 37 is connected to the pump output 31 channel 32A in order to ensure control of that ancillary organ.

Finally, in a third distributor position 40, the ancillary organ 37 is connected to tank return 43 channel 51B in order to ensure fluid discharge.

Distributors 33 and 40 are piloted by the pressure proper. Preferably, the pumps 31 are separated in relation to their zero discharge position, so as to saturate the circuit when the distributors are closed. This solution makes it possible to forgo the use of a hydraulic accumulator which would have been vital if, for lack of use, the pumps 31 registered zero discharge. Furthermore, one should note that only distributor leaks are compensated by the position adjustment of the pump, so that said pressure is used for piloting. Regardless, in the event of excessive pressure, the valve 36 intervenes.

In order to avoid vibration problems, all of the channels (32A-32B, 35, 38, 39, 41, 51A-51B) will be achieved with a flexible pipe.

The content of tank 34 must be determined in relation to the characteristics of the other elements, and especially of the discharge, in order to prevent excessive heating of the oil in the hydraulic circuit. With the preferred elements of which the references have been indicated previously, the correct capacity of the tank 34 is assessed at 280 liters.

Now we will describe in greater detail the implementation mode of the regulating circuit 100 which is depicted in FIG. 2 that ensures adjustment of the discharge inside the auxiliary hydraulic circuit which is proportionate to the tractor speed.

This regulating circuit 100 is designed to supply a datum in the shape of an electrical signal, which is representative of the speed of tractor 1 so as to pilot subsequently and proportionately the discharge inside the hydraulic circuit that connects each pump to each engine and especially the discharge from the pumps 31, in the implementation mode depicted in FIG. 2.

One understands that the regulating circuit 100 must make it possible to have interchangeability between tractors 1 and associated trailers 10.

The regulating circuit 100 includes a tachometric pick-up 101, which is tractor speed sensitive 1 (which will be described in greater detail in the rest of this description, facing FIG. 3), and a downward conditioning circuit and a signal shaping circuit.

Said tachometric pick-up 101 can be formed either by a tachometric dynamo 102 which has an output an analog voltage which is a function of the number of tractor wheel rounds 1, hence of its traveling speed, or of a tachometric alternator which delivers at the output a frequency that is proportionate to the tractor speed.

In the latter case, it is then necessary to intersperse, in the conditioning circuit, a frequency/voltage converter 130 (depicted in jagged lines in FIG. 2).

As shown in FIG. 2, the tachometric pick-up 101 is connected to the input of a relay gear 131 which is adapted to allow the electrical signal to come through which originates in the pick-up 101 when an operating lever (not shown) for forward or reverse positions, for instance placed on the tractor console, is solicited. In practice, the relay gear 131 can be comprised of two relays where one is controlled by a forward signal, and the other by a reverse signal.

The relay gear output 131 is connected to the input of a variable gain amplifier 132 of which the output is sent to a switch circuit 133. The switch circuit outputs 133 are connected by way of links 134, 135, 136, and 137 to respective amplifier circuits 43 (depicted schematically) and associated to each previously mentioned pump 31, and which control their discharge.

In other words, the amplifier cards 43 represent electronic modules to control pumps 31 electrically.

The variable gain amplifier 132 is designed to be compatible with the output voltage which is delivered by the tachometric dynamo 101 (or the alternator and the frequency/voltage converter 130) both the voltage that is required by the amplifier cards 43.

Hence, for instance if the control voltage of the amplifier circuits 43 must be included between 0 and 9 Volts, it is necessary for the amplifier output voltage 132 to equal 9 Volts for a maximal assistance speed of 20 km/hr for instance. The amplifying or attenuating characteristics of the amplifier 132 are therefore subsequently easily determined.

The switch circuit 133 is adapted so that in an initial position, it retransmits the voltage which is on its input at the level of its four outputs, and from there, by way of the links 134 through 137, on the previously mentioned amplifier circuits 43.

While in another position of the switch circuit which is obtained when the appropriate ancillary organ control signal 47, or jack, such as a lifting signal, is applied to the appropriate conditioner input, it delivers output voltage only on a link 134 coupled at the amplifier circuit 43 that is associated to a pump 31 which is connected both to a hydraulic circuit 30 and to a hydraulic circuit 30A for control of the ancillary organ 37.

Moreover the switch circuit is adapted so that it can deliver to the corresponding amplifier circuit 43 a standard signal of which the amplitude is determined in function of the desired tuning for the pump so as to obtain the wished for discharge.

In most cases, the electrical masses of the amplifier circuit 43 (placed on the trailer) and the mass of the regulating device is not common, so we will plan separate supplying to the variable gain amplifier 102.

Preferably, in order not to deteriorate the wheel engines 50, at the level of the signal regulating device, one plans a Zener diode which is sensitive to the voltage delivered by the latter which cuts the supply to the pumps 31 when the tractor 1 speed exceeds a particular value, 20 km/hr for instance.

Furthemore, in an advantageous way, a potentiometer for the signal regulating device, mounted on the console, and for instance acting on the variable gain amplifier 132, makes it possible to space by about 5% the datum which is representative of the tractor speed, that is supplied by the tachometric pick-up 101, in the direction of an increase in pump discharge 31, so that in such a case, the trailer has a tendency to push the tractor.

Now we will describe in greater detail the implementation mode of the tachometric pick-up 101 which is depicted in FIG. 3.

This tachometric pick-up 101 is comprised of an upper crank-case 103 and a lower crank-case 104, which houses a tachometric axis 105 and that supports a tachometric generator 102.

The latter is assembled on the upper crank-case with all appropriate means such as a screw 106. In FIG. 3, one distinguishes output plots 107 from the tachometric generator 102.

The axis 108 of the tachometric generator 102 is coupled by way of a pin 109 to a cogged pinion 110.

The latter, by way of a serrated belt 111, cooperates with a cogged pinion 112 which is affixed to the tachometric axis 105. As shown in FIG. 3, the two cogged pinions 110 and 112 and the serrated belt 111 are lodged in a chamber defined by the two upper 103 and lower 104 crank-cases.

On both sides of the cogged pinion 112, the tachometric axis 105 carries a casing 113, and on the other hand a sheath 114, the latter being equipped, outside of the lower crank-case 104, with an open ring or circlips 115 that is engaged in an annular groove on its periphery.

The axis 105 is engaged coaxially inside the casing 113 and the sheath 114. The casing 113 rests at the level of a support bearing 120 that is planned at one of the tips against the upper crank-case 103.

Moreover, the tachometric axis 105 is inserted between standard parts initially assembled among one another, and in rotation drive by the main tractor engine organ, each extremity of the axis 105 is preferably equipped with an appropriate structure, like an axial spline 116 and an axial slit 117 which can cooperate with the previously mentioned parts; while the casing 113 and the sheath 114 are similarly equipped with appropriate structures, such as a threaded radial bore 118 and radial flat parts or blind holes 119.

Of course, the special shape of the tachometric axis 105, of the sheath 114 and of the casing 118 is adapted in relation to each standard. Hence, as a variation, the open extremity of the casing 113 can be externally threaded while the open extremity of the sheath 114 is equipped with a nut.

The tachometric axis 105 must therefore be inserted between two standard parts that have been initially assembled and selected so that the datum delivered by the tachometric pick-up 101 is completely independent from the speed ratio which is engaged on the tractor. To this end, the tachometric pick-up can be mounted for instance at the output of the gearbox that is associated to the main engine organ, at the level of the tachometric cable socket.

The tachometric pick-up 101 can be mounted of course at any appropriate point, like the speedometer plug or the transmission shaft.

Preferably, one of the crank-cases of the pick-up 101 is equipped with centering stands (not depicted in FIG. 3). This pick-up 101 is easily immobilized with all appropriate means, such as screws which cross corresponding bores that are planned in the crank-cases.

The ratio between the two cogged pinions 110 and 112 placed respectively on axis 108 of the tachometric generator 102 and on the tachometric axis 105 will be determined so that the voltage (or the frequency in the event of a tachometric alternator) provided by the tachometric generator 102 is compatible with the required input levels for the regulating system elements placed downward.

Furthermore, one should note that some manufacturers, under specific working conditions, impose pressure control at the level of the return channeling of hydraulic motors or wheel-engines 50, so as to especially extend their lifespan.

To this end, for instance one can intersperse at the level of the channel 51B for return to the tank, a distributor 44, 4 tracks, 2 positions of which one track is obstructed, or 3 tracks, 2 positions.

In an initial position, the channel 51B communicates directly with the tank 34.

In a second position, a check-valve 45, which is correctly adjusted, at 10 bars for example, is inserted at the level of that channel 51B.

Furthermore, in order to prevent cavitation effects in hydraulic motors 50, it is better for a check-valve 46 to be connected between the channel 32A and channel 51B, parallel to valve 36, while allowing suction from channel 51B to channel 32A.

This invention is obviously not limited to the implementation modes which have been described from which one can anticipate many implementation variations which are pursuant to the intent of the invention.

Hence, one can expect to use static flow 31 pumps, and modulate the capacity of variable capacity wheel engines, with signals that are generated by the regulating system 100.

Finally, the ancillary organ 37 can be used for many applications like lifting, moving cranes or winches.

Furthermore, the invention is not restricted to trailers which are used within the framework of road transportation but it extends to all towed vehicles which are used, on a work site for example, and in a general way on ground where there are adherence if not sinking problems.

We claim:

1. In a vehicle including a tractor and a trailer attached to the tractor wherein, the tractor comprises driving wheels and a main engine connected to said driving wheels and wherein the trailer comprises driven wheels, at least one auxiliary engine in the trailer and powering the trailer, a plurality of hydraulic motors in the trailer which are connected, respectively, to the driven wheels of the trailer by hydraulic circuits in the trailer, said hydraulic circuits including pumps, the pumps being powered by said at least one auxiliary, engine, and a regulating element coupled to and controlling said hydraulic circuits; the improvement wherein said at least one auxiliary engine operated independently of said regulating element, and said regulating element comprises a tachometric pick up provided on the main engine and generating an electrical signal proportional to the rotating speed of the main engine of the tractor, means for controlling the trailer pump output to the hydraulic motors in the trailer, and means coupling the said electrical signal to said means for controlling the trailer pump output so that the discharge in the hydraulic circuits is proportional to the rotating speed of said main engine.

2. A device according to claim 1, wherein each hydraulic circuit which connects a pump with a hydraulic motor is of the open circuit kind, said pumps discharging to the hydraulic motors of which the return is conducted to a tank where pump suction takes place.

3. A device according to claim 1 wherein the hydraulic motors have set capacities and the pumps are variable discharge pumps which are controlled by said signal generated by the tachometric pick up.

4. A device according to claim 1 wherein the pumps are static discharge pumps and the hydraulic motors have variable capacities controlled by said signal generated by the tachometric pick up.

5. A device according to claim 1 wherein the pumps with a set capacity discharge to motors with set capacity through a valve with proportionate discharge regulation which is controlled by said signal generated by the tachometric pick up.

6. A device according to claim 1 including a distributor of the four-tracks, three-position type placed in each hydraulic circuit and connecting a pump to a hydraulic motor, a first channel (35) connecting an input of the pump to a tank, a second channel (51B) connecting the tank to a first track, a third channel (32A) connecting the output of the pump to a second track, a fourth channel (51A) connecting a first orifice of the motor to a third track and a fifth channel (32B) connecting a second orifice of the motor to a fourth track, whereby in a first position of the distributor the second channel is connected to a first orifice of a hydraulic motor and the output of the pump is connected to a second orifice of said hydraulic motor, in a second position the second channel is connected to the second orifice of the motor and the output of the pump is connected to the first orifice of the motor, while in a third position of the distributor, at least one way between the input or the output of the pump and an orifice of the motor is interrupted.

7. A device according to claim 1 wherein at least one of the hydraulic pumps controls an auxiliary jack.

8. A device according to claim 7, including a distributor of the 4 track, 3 position type of which one track thereof is blocked, the distributor being located in the hydraulic circuit that connects said auxiliary jack to the associated pump.

9. A device according to claim 7 wherein the regulating element includes a switch circuit which controls either all of the pumps, or only the pump which is connected to said auxiliary jack.

* * * * *

UNITED STATES PATENT AND TRADEMARK OFFICE
CERTIFICATE OF CORRECTION

PATENT NO. : 4,625,821
DATED : December 2, 1986
INVENTOR(S) : Gabriel Aumont, et al It is certified that error appears in the above-identified patent and that said Letters Patent is hereby corrected as shown below:

On the title page Insert

--(73)Assignee: Gabriel Aumont --.

Signed and Sealed this

Twenty-fourth Day of November, 1987

*Attest:*

DONALD J. QUIGG

*Attesting Officer*  *Commissioner of Patents and Trademarks*